(12) United States Patent  
Sennett et al.

(10) Patent No.: US 8,380,159 B2
(45) Date of Patent: Feb. 19, 2013

(54) PROVISION OF AN EMERGENCY ALERT SYSTEM ALERT MESSAGE VIA A PERSONAL AREA NETWORK COMPATIBLE ACCESSORY

(75) Inventors: DeWayne Allan Sennett, Redmond, WA (US); Brian Kevin Daly, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 923 days.

(21) Appl. No.: 12/051,888

(22) Filed: Mar. 20, 2008

(65) Prior Publication Data
US 2009/0239497 A1  Sep. 24, 2009

(51) Int. Cl.
*H04W 72/00* (2009.01)
*H04L 12/28* (2006.01)
*G06F 15/16* (2006.01)
*H04M 11/04* (2006.01)

(52) U.S. Cl. ............... 455/404.1; 455/450; 370/252; 709/228; 379/45

(58) Field of Classification Search ............... 455/450, 455/404.1; 379/45, 38, 42; 705/14; 370/252; 709/228
See application file for complete search history.

(56) References Cited

U.S. PATENT DOCUMENTS

| 6,112,075 | A | 8/2000 | Weiser | |
|---|---|---|---|---|
| 7,130,610 | B2* | 10/2006 | Dolezal et al. | 455/404.1 |
| 2003/0220988 | A1* | 11/2003 | Hymel | 709/220 |
| 2006/0040639 | A1 | 2/2006 | Karl et al. | |
| 2009/0023452 | A1* | 1/2009 | Quigley et al. | 455/450 |
| 2009/0138353 | A1* | 5/2009 | Mendelson | 705/14 |
| 2011/0037590 | A1* | 2/2011 | Kannan | 340/539.13 |

* cited by examiner

*Primary Examiner* — George Eng
*Assistant Examiner* — Nizar Sivji
(74) *Attorney, Agent, or Firm* — Woodcock Washburn LLP

(57) ABSTRACT

A wireless communication device receives a message. If the message is an emergency alert message, such as an EAS alert message, the wireless communication device issues a notification to an accessory device using a personal area network, which may be established using Bluetooth or another personal area network protocol. The notification is distinct from a notification that is issued to the accessory device when a standard communication, such as a voice call or a non-emergency message, is received by the wireless communication device.

20 Claims, 6 Drawing Sheets

PROVISION OF AN EMERGENCY ALERT SYSTEM ALERT MESSAGE VIA A PERSONAL AREA NETWORK COMPATIBLE ACCESSORY

TECHNICAL BACKGROUND

The disclosure relates generally to communications systems. More particularly, the disclosure relates to the broadcast of Emergency Alert System (EAS) alert messages.

BACKGROUND

The Federal Communications Commission (FCC) designed the Emergency Alert System (EAS) to provide a way of addressing the American people in the event of a national emergency. In addition, state and local emergency information can be transmitted using the EAS. The EAS is implemented through a cooperative arrangement among the FCC, the Federal Emergency Management Agency (FEMA), the National Weather Service (NWS), and the states.

Local emergency management officials use the EAS to communicate local emergency messages using broadcast radio and television stations, cable, and wireless cable systems. Recently, digital television (DTV) broadcasters, digital cable television providers, digital broadcast radio providers, digital audio radio service (DARS) providers, and direct broadcast satellite (DBS) providers have been required to participate in the EAS.

While the EAS has generally been effective in communicating emergency information to the public, one drawback of the EAS is that it has historically been able to reach only persons who are watching television or listening to the radio when an alert is issued. In response to this shortcoming, a new infrastructure known as the Digital Emergency Alert System is being developed. The Digital EAS will allow EAS alert messages to be transmitted directly to citizens and responders. EAS alert messages will be sent to users of computers, wireless communication devices such as mobile phones and pagers, and other devices. Accordingly, under the Digital EAS infrastructure, it may be possible to communicate emergency information to anyone who is equipped with, for example, a mobile phone, and not just persons who happen to be watching television or listening to the radio when an EAS alert is issued.

Many users of mobile phones use hands-free accessories, such as headsets, for a variety of reasons. For example, in several jurisdictions, it is illegal to operate a mobile phone without a headset when driving. In addition, many users of mobile phones find that headsets facilitate many activities by enabling the use of both hands for other tasks. Given the large number of mobile phone users who employ headsets and other hands-free accessories, providing support for such devices in a Digital EAS system may be beneficial for both subscribers and providers of wireless communication services.

SUMMARY OF THE DISCLOSURE

According to various example embodiments, a wireless communication device receives a message. If the message is an emergency alert message, such as an EAS alert message, the wireless communication device issues a notification to an accessory device using a personal area network, which may be established using the Bluetooth communication protocol. The notification is distinct from a notification that is issued to the accessory device when a standard communication, such as a voice call or a non-emergency message, is received by the wireless communication device.

Additional objects, advantages, and features will become apparent from the following description and the claims that follow, considered in conjunction with the accompanying drawings.

DESCRIPTION OF VARIOUS EMBODIMENTS

Figure 1:
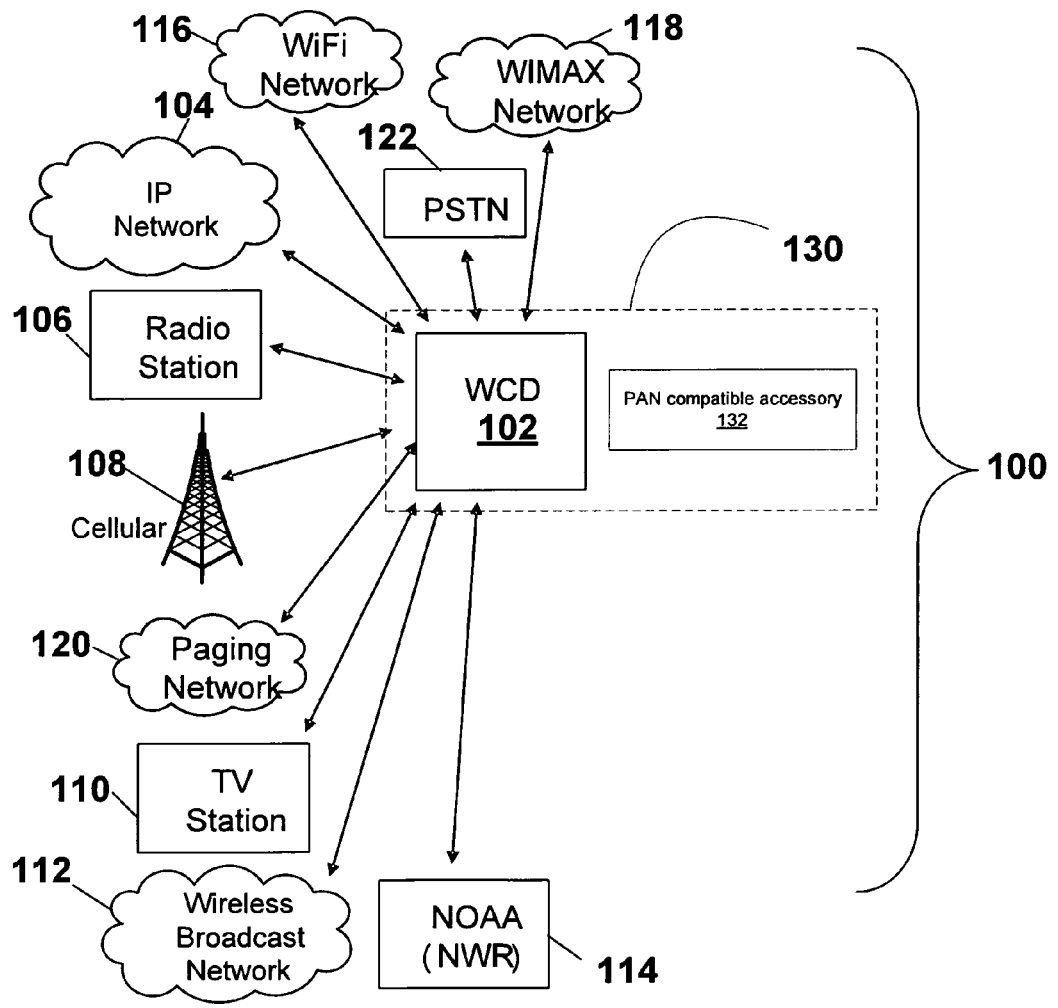
FIG. 1 is a depiction of an example system for providing an indication of an EAS alert via a remote device.

Subscribers of the digital Emergency Alert System (EAS) can receive alerts relating to a variety of conditions on a computer, wireless communication device, such as a mobile phone or a pager, or other type of device. The conditions for which a subscriber can receive an alert include, but are not limited to, weather (e.g., windstorm, tornado, hurricane, tsunami, lightning storms, thunderstorms, freezing rain, blizzards, and fog), geophysical conditions (e.g., landslides, earthquakes), general emergency and public safety, law enforcement, child abduction (e.g., America's Missing: Broadcast Emergency Response (AMBER) alerts), military, homeland and local or private security, rescue and recovery, fire suppression and rescue, transportation, utility, telecommunication, other non-transport infrastructure, CBRNE (chemical, biological, radiological, nuclear, or explosive) threat or attack, EAS tests, and other appropriate types of alerts.

In an example configuration, a wireless communication device, such as a mobile phone, receives an EAS alert message from a wireless communication network. The wireless communication device uses a personal area network (PAN) to communicate with another device connected to the personal area network, such as a headset or other hands-free device. The hands-free device notifies a user of the wireless communication device that the wireless communication device has received an EAS alert message. This notification can be accomplished, for example, using an audio signal or a vibration signal. In some cases, the hands-free device may be equipped with a display component that can be used to communicate the EAS alert message to the user of the wireless communication device. The notification is preferably distinct from a notification used for other messages received by the wireless communication device.

Certain advantages may be realized as a result. For instance, users of wireless communication devices can be notified of EAS alert messages even when they cannot access their wireless communication devices directly, such as when driving.

According to various embodiments, a wireless communication device receives a message. If the message is an emergency alert message, such as an EAS alert message, the wireless communication device issues a notification to an accessory device using a personal area network, which may be established using the Bluetooth communication protocol. The notification is distinct from a notification that is issued to the accessory device when a standard communication, such as a voice call or a non-emergency message, is received by the wireless communication device.

The following description of various embodiments implemented in the context of using a Bluetooth-enabled headset to notify a mobile phone user of the receipt of an EAS alert message, is to be construed by way of illustration rather than limitation. This description is not intended to limit the invention or its applications or uses. For example, while various embodiments are described as being implemented in this context, it will be appreciated that the principles of the disclosure are applicable to electronic document generation in other contexts. Such contexts may include other types of Bluetooth or other personal area network protocol enabled devices, for example, or may involve the use of wireless communication devices other than mobile phones, such as pagers. In addition, certain contexts may involve the use of a Bluetooth or other personal area network protocol enabled device to notify a user of a personal computer (PC) that the PC has received an EAS alert message.

In the following description, numerous specific details are set forth in order to provide a thorough understanding of various embodiments. It will be apparent to one skilled in the art that some embodiments may be practiced without some or all of these specific details. In other instances, well known components and process steps have not been described in detail.

Various embodiments may be described in the general context of processor-executable instructions, such as program modules, being executed by a processor. Generally, program modules include routines, programs, objects, components, data structures, etc., that perform particular tasks or implement particular abstract data types. The invention may also be practiced in distributed processing environments in which tasks are performed by remote processing devices that are linked through a communications network or other data transmission medium. In a distributed processing environment, program modules and other data may be located in both local and remote storage media, including memory storage devices.

For the purposes of this disclosure, the term "wireless communication device" or "WCD" is intended to include wireless phones (including cellular, mobile, and satellite phones), and also to include a variety of other wireless devices, including automobile, laptop, and desktop computers that communicate wirelessly, and wireless personal digital assistants (PDAs) and smartphones. In general, the term "wireless communication device" refers to any device with wireless communication capabilities, potentially including other devices not specifically enumerated above.

Referring now to the drawings, FIG. 1 is a system diagram illustrating an example communications network 100 for providing an indication of an EAS alert message using a personal area network (PAN) compatible accessory, according to one embodiment. A wireless communication device (WCD) 102, such as a mobile phone or pager, is configured to receive an EAS alert message from any one or a combination of a number of sources. For example, as depicted in FIG. 1, the WCD 102 may receive the EAS alert message from an Internet Protocol (IP) network 104, a radio station 106, a cellular network 108, a television station 110, a wireless broadcast network 112, a National Oceanic and Atmospheric Administration (NOAA) National Weather Service (NWS) transmitter 114, a WiFi network 116 (based on IEEE 802.11 networking standards), a WIMAX network 118 (based on IEEE 802.16 networking standards), a paging network 120, a Public Switched Telephone Network (PSTN) 122, or any combination of these sources. As a particular example, an EAS alert message can be provided using the IP network 104 as packets of data. In some cases, the EAS alert message can be transmitted in either a digital format or an analog format, or in a combination of both formats. For example, the radio station 106 can provide an analog AM or FM transmission, a digital transmission, or both. Similarly, the television station 110 can provide an analog AM or FM transmission, a digital transmission, or both. As another example, the NOAA NWS transmitter 114 provides weather-related warnings, watches, and forecasts and other hazard information as a public service.

In an example embodiment, the WCD 102 is configured to receive an EAS alert message from one or more of the sources enumerated above. The WCD 102 then uses a personal area network (PAN) or piconet 130 to communicate the EAS message to a PAN compatible accessory 132. The PAN 130 may be implemented, for example, using a Bluetooth wireless connection. The Bluetooth system operates in the unlicensed ISM frequency band at 2.4 GHz and allows data communications between a Bluetooth enabled host, e.g., the WCD 102, and a Bluetooth enabled device, such as a headset.

Figure 2:
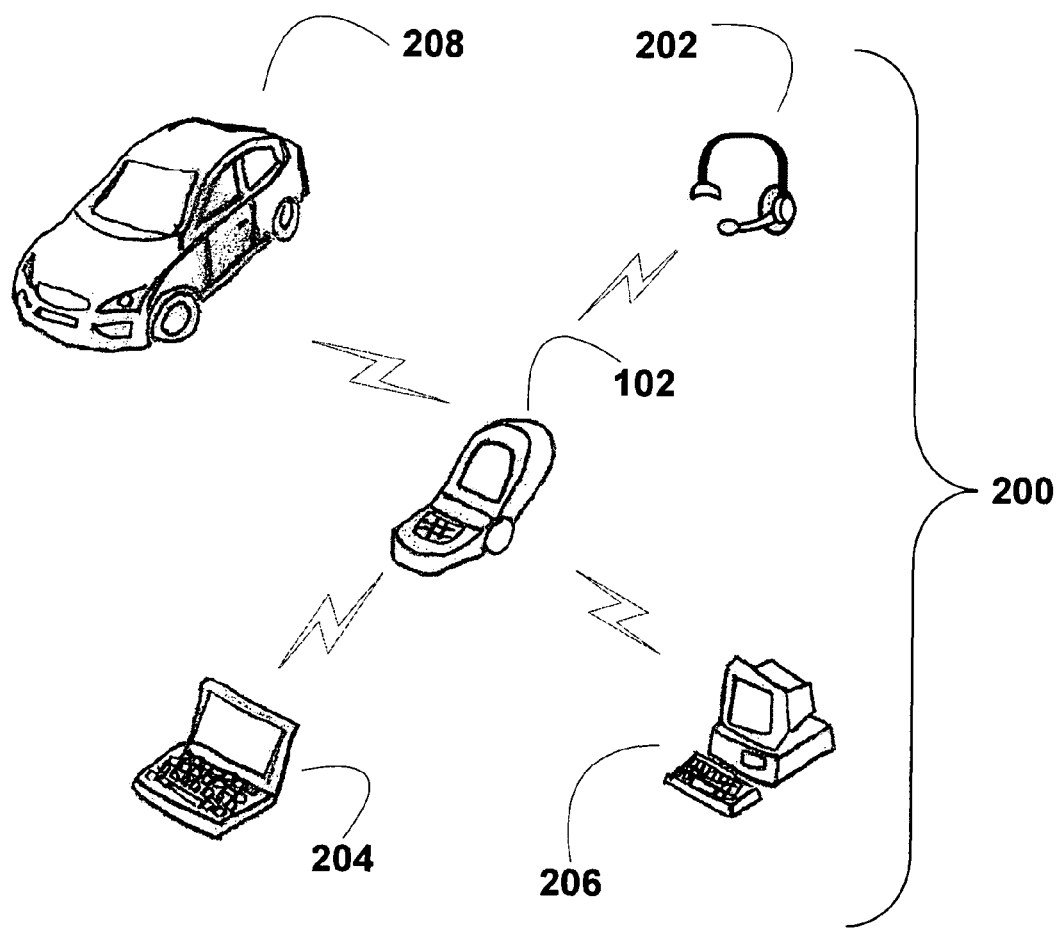
FIG. 2 illustrates an example personal area network (PAN) including a wireless communication device and a PAN compatible accessory.

FIG. 2 illustrates an example PAN 200 including the WCD 102 and a PAN compatible accessory, such as a Bluetooth enabled headset 202. Other devices may be connected to the PAN 200, such as, for example, a laptop computer 204, a desktop computer 206, a vehicle communication system installed in a vehicle 208, or a hands-free in-car speakerphone unit mounted, for example, on a visor of the vehicle 208. It will be appreciated that a particular PAN will not incorporate all of these devices. For example, the PAN 200 would not typically be simultaneously connected to both the desktop computer 206 and a vehicle communication system installed in the vehicle 208. Thus, the particular devices enumerated above are intended only to provide a nonexhaustive list of some devices that may be connected to the PAN 200, and not to imply that the PAN 200 must incorporate all of the enumerated devices.

The WCD 102 and the other devices in the PAN 200 are connected to the PAN 200 using a wireless communication protocol, such as the Bluetooth protocol. The Bluetooth protocol allows devices in the PAN 200 to communicate with one another when they are within range. The range over which a device can communicate with another device depends on the transmitter power of the device. For example, a Class 1 device's maximum permitted transmitter power is 100 mW, enabling a maximum range of approximately 100 meters. A Class 2 device's maximum permitted transmitter power is 2.5 mW, which corresponds to a maximum range of approximately 10 meters. A Class 3 device's maximum permitted transmitter power is 1 mW, which allows such a device to communicate over a range of approximately 1 meter. It will be appreciated that the effective range of a transmitter also depends on the sensitivity of the receiving device. In general, a Class 1 device is more sensitive than a Class 2 device, which is more sensitive than a Class 3 device. Thus, the effective range of a Class 2 device is higher when it is in communication with a Class 1 device than when it is in communication with another Class 2 device.

During operation of the PAN 200, the devices connected to the PAN 200 share a common radio channel operating in, for example, the ISM frequency band of 2.4 GHz. This frequency band encompasses frequencies between 2400 MHz and 2483.5 MHz in the United States and most of Europe. The devices are synchronized to a common clock and frequency hopping pattern. One device, such as the WCD 102, provides the synchronization reference. The frequency hopping pattern is determined in part by the clock of the WCD 102, assuming that the WCD 102 provides the synchronization reference, and is a pseudo-random ordering of the frequencies in the ISM band. In some cases, other nearby devices not in the PAN 200 may also use certain frequencies in the ISM band. To reduce the effect of interference from devices not in the PAN 200, the PAN 200 may omit from the frequency hopping pattern frequencies that are used by interfering devices.

To share the common radio channel among the devices in the PAN 200, the Bluetooth protocol divides the common radio channel into time slots. Each device in the PAN 200 transmits packetized data within time slots assigned to it. In this way, devices communicating using the Bluetooth protocol use a time-division duplex (TDD) scheme to realize full duplex transmission. Frequency hopping may occur between time slots in which data is transmitted or received.

At a basic level, the Bluetooth data transport architecture can be divided into a physical layer, a logical layer, and a logical link control and adaptation protocol (L2CAP) layer. The channel hopping sequence, slot timing, and an access code define a physical channel. A physical link layer resides above the physical channel. Within a physical channel, any two devices that transmit data packets between them form a physical link layer. The physical channel and physical link layer together define the physical layer.

The logical layer includes a logical transport layer and logical link layer that reside above the physical link layer. The physical link layer serves as a transport for one or more logical links that support unicast and/or broadcast traffic. Residing above the logical layer is the L2CAP layer, which segments and reassembles application data and multiplexes and demultiplexes multiple logical channels, known as L2CAP channels, over a shared logical link.

The above description of the Bluetooth protocol is intended to provide a summary only. The detailed architecture and operation of the Bluetooth protocol is beyond the scope of this disclosure, but is well understood by persons of ordinary skill in the area of wireless communications.

Figure 3:
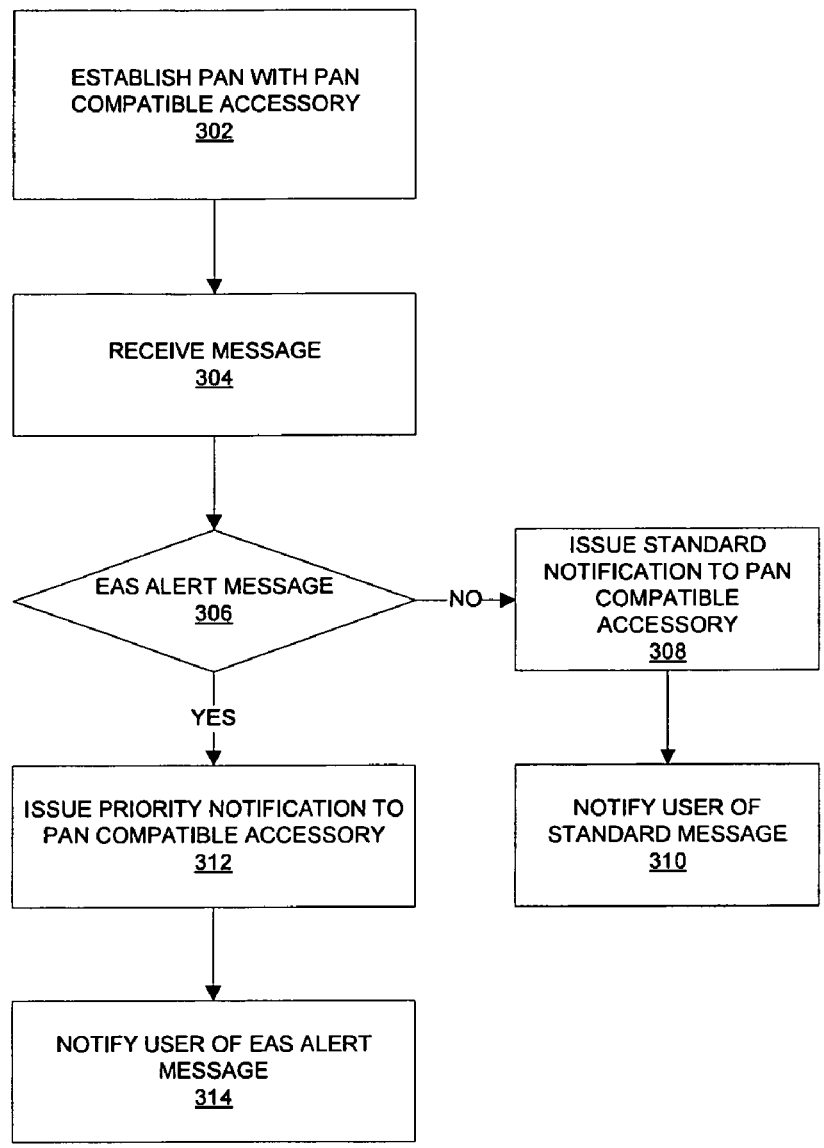
FIG. 3 is a flow diagram of an example process for providing a notification of an EAS alert message using a PAN compatible accessory.

FIG. 3 is a flow diagram of an example process 300 for providing a notification of an EAS alert message using a PAN compatible accessory, such as, for example, the Bluetooth enabled headset 202 of FIG. 2. At a step 302, the WCD 102 establishes a PAN with the Bluetooth enabled headset 202 and/or other PAN compatible accessories. At a step 304, the WCD 102 receives a message from any one or more of the sources depicted in FIG. 1. In some embodiments, the WCD 102 searches for messages when the WCD 102 is idle, e.g., when the WCD 102 is not engaged in a call.

The message received by the WCD 102 may be, for example, a short message service (SMS) message, a broadcast text message, or a multimedia message service (MMS) message and may or may not be an EAS alert message. EAS alert messages may be implemented as broadcast text messages or MMS messages. In some embodiments, EAS alert messages are distinguished from non-EAS messages by one or more message identifiers, such as a prefix or header. The message identifier marks an EAS alert message as a priority message that occupies a different logical channel from standard messages. The message identifier may also provide further information as to the type of alert communicated by the EAS alert message. For example, different message identifiers may be used to differentiate between weather- and homeland security-related alerts. Within a particular type of alert, message identifiers may also be used to differentiate between multiple levels of urgency or severity. For example, message identifiers may be used to differentiate between an alert relating to a thunderstorm and one relating to a tornado. Message identifiers may also be used to define a geographical area of relevance for an EAS alert messages so that the WCD 102 can ignore EAS alert messages that do not relate to the current location of the WCD 102. It will be appreciated that any of the above information relating to the content of the EAS alert message may be conveyed in the body of the EAS alert message in addition to or instead of the message identifier.

Referring again to FIG. 3, at a step 306, the WCD 102 determines whether the received message is a standard message or an EAS alert message. For example, the WCD 102 may examine the received message to determine whether a message identifier is present. If the received message is a standard message, then, at a step 308, the WCD 102 uses the PAN 200 to communicate a standard notification to the PAN compatible accessory. The PAN compatible accessory then notifies the user that a standard message has arrived at a step 310. For example, if the PAN compatible accessory is implemented as the Bluetooth enabled headset 202, the Bluetooth enabled headset 202 may generate a particular type of audio signal, such as a tone of a certain frequency or a combination of tones. In addition to or instead of the audio signal, the PAN compatible accessory may generate another type of signal, such as, for example, a vibration signal or an LED illumination signal.

If, on the other hand, the WCD 102 determines at step 306 that the received message is an EAS alert message, then, at a step 312, the WCD 102 uses the PAN 200 to communicate a priority notification to the PAN compatible accessory. The PAN compatible accessory then notifies the user that an EAS alert message has arrived at a step 314. For example, if the PAN compatible accessory is implemented as the Bluetooth enabled headset 202, the Bluetooth enabled headset 202 may generate an audio signal different from the audio signal used to notify the user of a standard message. The tone may be of a different frequency from the tone used to notify the user of a standard message, or a different combination of tones may be used. In some embodiments, the PAN compatible accessory may generate another type of signal, such as, for example, a vibration signal or an LED illumination signal. Such signals are preferably distinct from the signals used to notify the user of a standard message. For instance, a different vibration signal or LED illumination signal or color may be used.

In some embodiments, the signal generated by the PAN compatible accessory may provide greater granularity than differentiating between standard messages and EAS alert messages. In particular, the type of signal generated by the PAN compatible accessory may be selected as a function of the type of alert, the urgency of the alert, and/or the severity of the alert. As one example, different types of audio signals may be used for weather-related EAS alert messages as contrasted with homeland security-related EAS alert messages. As another example, different types of LED illumination signals or colors may be used for different levels of severity or urgency. For instance, an amber LED might illuminate for a relatively low severity EAS alert message, such as an EAS alert message relating to a thunderstorm, while a red LED might illuminate for a high priority EAS alert message, such as one relating to a tornado.

While the above disclosure assumes that the PAN compatible accessory is implemented as the Bluetooth enabled headset 202, it will be appreciated that the process depicted in FIG. 3 can be used to provide a notification of an EAS alert message using other types of PAN compatible accessories. Such accessories include, but are not limited to, an entertainment system integrated in a vehicle, a visor-mounted speakerphone, a laptop computer or desktop computer, or any other Bluetooth enabled device having audio or video capabilities. In the case of an entertainment system integrated in a vehicle, the normal rendering of audio or video may be interrupted to notify the user of an EAS alert message. Further, in the case of a laptop or desktop computer, or any other Bluetooth enabled device having video capabilities or a display, the notification may display the content of the EAS alert message.

The following description sets forth some exemplary telephony radio networks and non-limiting operating environments for providing a notification of an EAS alert message using a personal area network. The below-described operating environments should be considered non-exhaustive, however, and thus the below-described network architectures merely show how the services of the notification system for alerting users of portable devices of emergencies may be incorporated into existing network structures and architectures. It can be appreciated, however, that the notification system for alerting users of portable devices of emergencies can be incorporated into existing and/or future alternative architectures for communication networks as well.

The global system for mobile communication (GSM) is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), etc., as well as to other network services that become available in time. In this regard, the techniques of the notification system for alerting users of portable devices of emergencies can be applied independently of the method of data transport, and do not depend on any particular network architecture, or underlying protocols.

Figure 4:
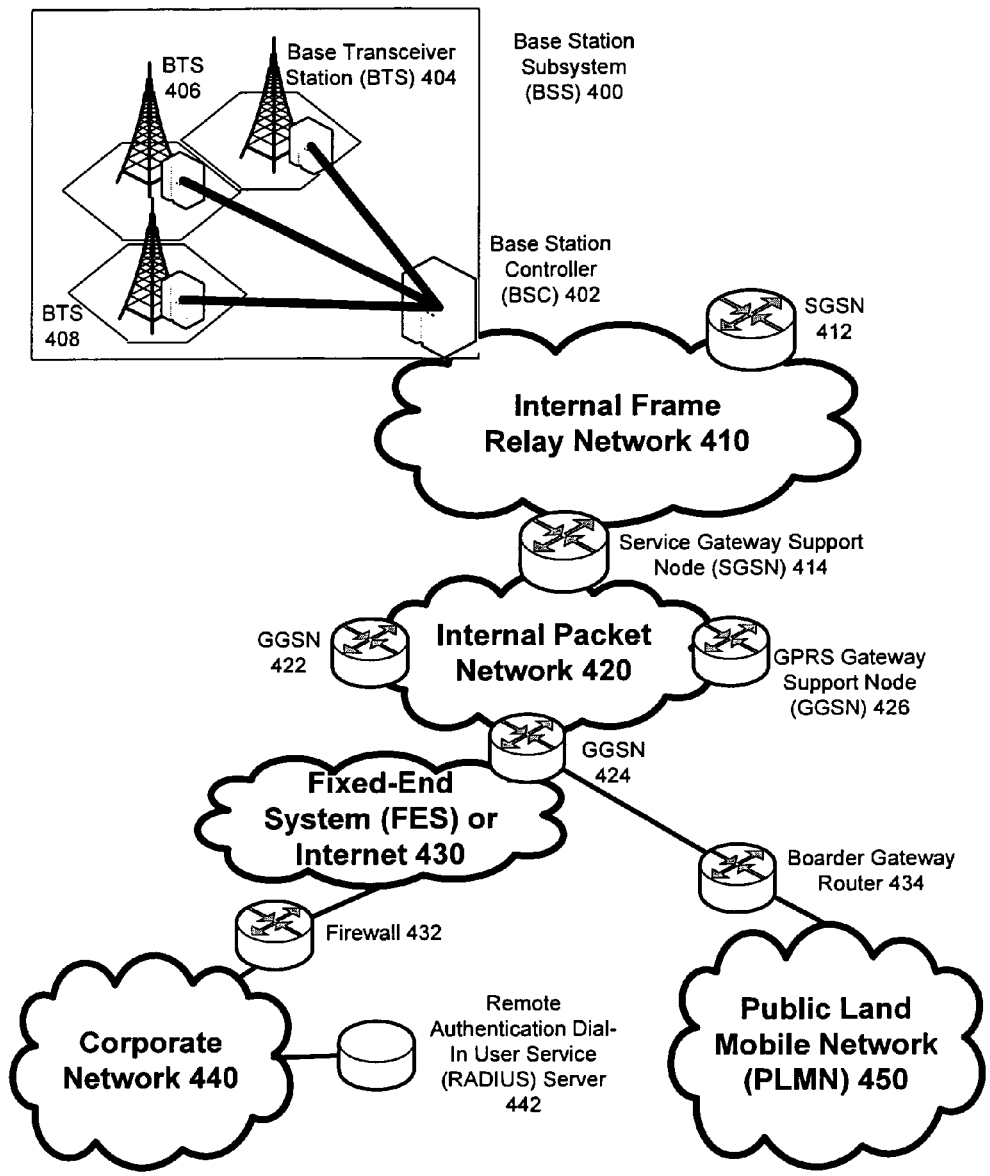
FIG. 4 illustrates an overview of an example network environment suitable for service by the emergency notification system for a wireless communication device using a personal area network compatible accessory.

FIG. 4 depicts an overall block diagram of an example packet-based mobile cellular network environment, such as a GPRS network, in which the notification system for alerting users of portable devices of emergencies can be practiced. In an example configuration, there are a plurality of Base Station Subsystems (BSS) 400 (only one is shown), each of which comprises a Base Station Controller (BSC) 402 serving a plurality of Base Transceiver Stations (BTS) such as BTSs 404, 406, and 408. BTSs 404, 406, 408, etc. are the access points where users of packet-based mobile devices (e.g., WCD 102) become connected to the wireless network. In exemplary fashion, the packet traffic originating from user devices (e.g., WCD 102) is transported via an over-the-air interface to a BTS 408, and from the BTS 408 to the BSC 402. Base station subsystems, such as BSS 400, are a part of internal frame relay network 410 that can include Service GPRS Support Nodes (SGSN) such as SGSN 412 and 414. Each SGSN is connected to an internal packet network 420 through which a SGSN 412, 414, etc. can route data packets to and from a plurality of gateway GPRS support nodes (GGSN) 422, 424, 426, etc. As illustrated, SGSN 414 and GGSNs 422, 424, and 426 are part of internal packet network 420. Gateway GPRS serving nodes 422, 424 and 426 mainly provide an interface to external Internet Protocol (IP) networks such as Public Land Mobile Network (PLMN) 450, corporate intranets 440, or Fixed-End System (FES) or the public Internet 430. As illustrated, subscriber corporate network 440 may be connected to GGSN 424 via firewall 432; and PLMN 450 is connected to GGSN 424 via boarder gateway router 434. The Remote Authentication Dial-In User Service (RADIUS) server 442 may be used for caller authentication when a user of a mobile cellular device calls corporate network 440.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
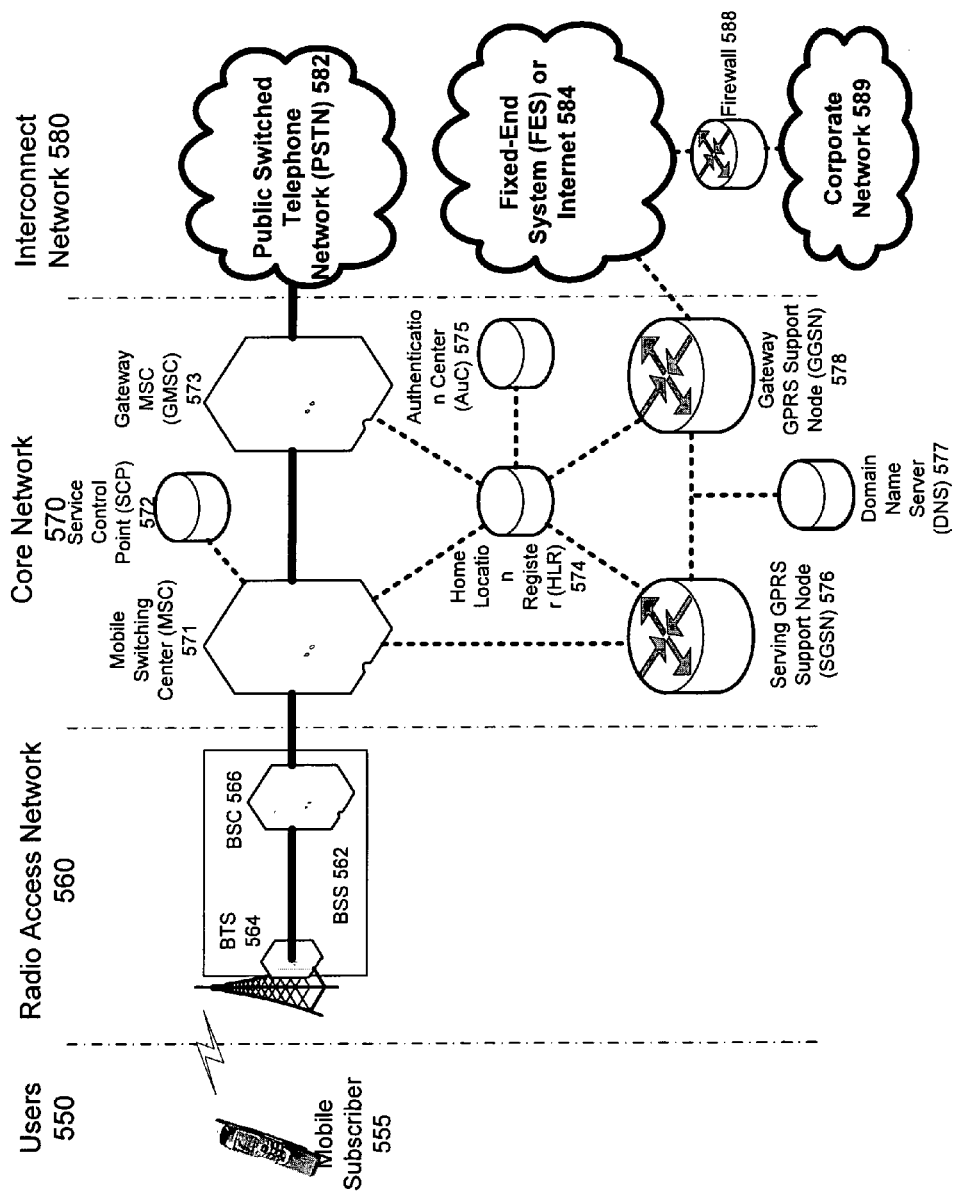
FIG. 5 illustrates an example GPRS network architecture that may incorporate various aspects of the emergency notification system for a wireless communication device using a personal area network compatible accessory.

FIG. 5 illustrates an architecture of a typical GPRS network as segmented into four groups: users 550, radio access network 560, core network 570, and interconnect network 580. Users 550 comprise a plurality of end users (though only mobile subscriber 555 is shown in FIG. 5). In an example embodiment, the device depicted as mobile subscriber 555 comprises the WCD 102. Radio access network 560 comprises a plurality of base station subsystems such as BSSs 562, which include BTSs 564 and BSCs 566. Core network 570 comprises a host of various network elements. As illustrated in FIG. 5, core network 570 may comprise Mobile Switching Center (MSC) 571, Service Control Point (SCP) 572, gateway MSC 573, SGSN 576, Home Location Register (HLR) 574, Authentication Center (AuC) 575, Domain Name Server (DNS) 577, and GGSN 578. Interconnect network 580 also comprises a host of various networks and other network elements. As illustrated in FIG. 5, interconnect network 580 comprises Public Switched Telephone Network (PSTN) 582, Fixed-End System (FES) or Internet 584, firewall 588, and Corporate Network 589.

A mobile switching center can be connected to a large number of base station controllers. At MSC 571, for instance, depending on the type of traffic, the traffic may be separated in that voice may be sent to Public Switched Telephone Network (PSTN) 582 through Gateway MSC (GMSC) 573, and/ or data may be sent to SGSN 576, which then sends the data traffic to GGSN 578 for further forwarding.

When MSC 571 receives call traffic, for example, from BSC 566, it sends a query to a database hosted by SCP 572. The SCP 572 processes the request and issues a response to MSC 571 so that it may continue call processing as appropriate. 33 The HLR 574 is a centralized database for users to register to the GPRS network. HLR 574 stores static information about the subscribers such as the International Mobile Subscriber Identity (IMSI), subscribed services, and a key for authenticating the subscriber. HLR 574 also stores dynamic subscriber information such as the current location of the mobile subscriber. Associated with HLR 574 is AuC 575. AuC 575 is a database that contains the algorithms for authenticating subscribers and includes the associated keys for encryption to safeguard the user input for authentication.

In this disclosure, depending on context, the term "mobile subscriber" sometimes refers to the end user and sometimes to the actual portable device, such as the WCD 102, used by an end user of the mobile cellular service. When a mobile subscriber turns on his or her mobile device, the mobile device goes through an attach process by which the mobile device attaches to an SGSN of the GPRS network. In FIG. 5, when mobile subscriber 555 initiates the attach process by turning on the network capabilities of the mobile device, an attach request is sent by mobile subscriber 555 to SGSN 576. The SGSN 576 queries another SGSN, to which mobile subscriber 555 was attached before, for the identity of mobile subscriber 555. Upon receiving the identity of mobile subscriber 555 from the other SGSN, SGSN 576 requests more information from mobile subscriber 555. This information is used to authenticate mobile subscriber 555 to SGSN 576 by HLR 574. Once verified, SGSN 576 sends a location update to HLR 574 indicating the change of location to a new SGSN, in this case SGSN 576. HLR 574 notifies the old SGSN, to which mobile subscriber 555 was attached before, to cancel the location process for mobile subscriber 555. HLR 574 then notifies SGSN 576 that the location update has been performed. At this time, SGSN 576 sends an Attach Accept message to mobile subscriber 555, which in turn sends an Attach Complete message to SGSN 576.

After attaching itself with the network, mobile subscriber 555 then goes through the authentication process. In the authentication process, SGSN 576 sends the authentication information to HLR 574, which sends information back to SGSN 576 based on the user profile that was part of the user's initial setup. The SGSN 576 then sends a request for authentication and ciphering to mobile subscriber 555. The mobile subscriber 555 uses an algorithm to send the user identification (ID) and password to SGSN 576. The SGSN 576 uses the same algorithm and compares the result. If a match occurs, SGSN 576 authenticates mobile subscriber 555. Next, the mobile subscriber 555 establishes a user session with the destination network, corporate network 589, by going through a Packet Data Protocol (PDP) activation process. Briefly, in the process, mobile subscriber 555 requests access to the Access Point Name (APN), for example, UPS.com (e.g., which can be corporate network 589 in FIG. 5) and SGSN 576 receives the activation request from mobile subscriber 555. SGSN 576 then initiates a Domain Name Service (DNS) query to learn which GGSN node has access to the UPS.com APN. The DNS query is sent to the DNS server within the core network 570, such as DNS 577, which is provisioned to map to one or more GGSN nodes in the core network 570. Based on the APN, the mapped GGSN 578 can access the requested corporate network 589. The SGSN 576 then sends to GGSN 578 a Create Packet Data Protocol (PDP) Context Request message that contains necessary information. The GGSN 578 sends a Create PDP Context Response message to SGSN 576, which then sends an Activate PDP Context Accept message to mobile subscriber 555.

Once activated, data packets of the call made by mobile subscriber 555 can then go through radio access network 560, core network 570, and interconnect network 580, in a particular fixed-end system or Internet 584 and firewall 588, to reach corporate network 589.

Thus, network elements that can invoke the functionality of the EAS alert reporting in accordance the emergency notification system for a portable device of a user can include but are not limited to Gateway GPRS Support Node tables, Fixed End System router tables, firewall systems, VPN tunnels, and any number of other network elements as required by the particular digital network.

Figure 6:
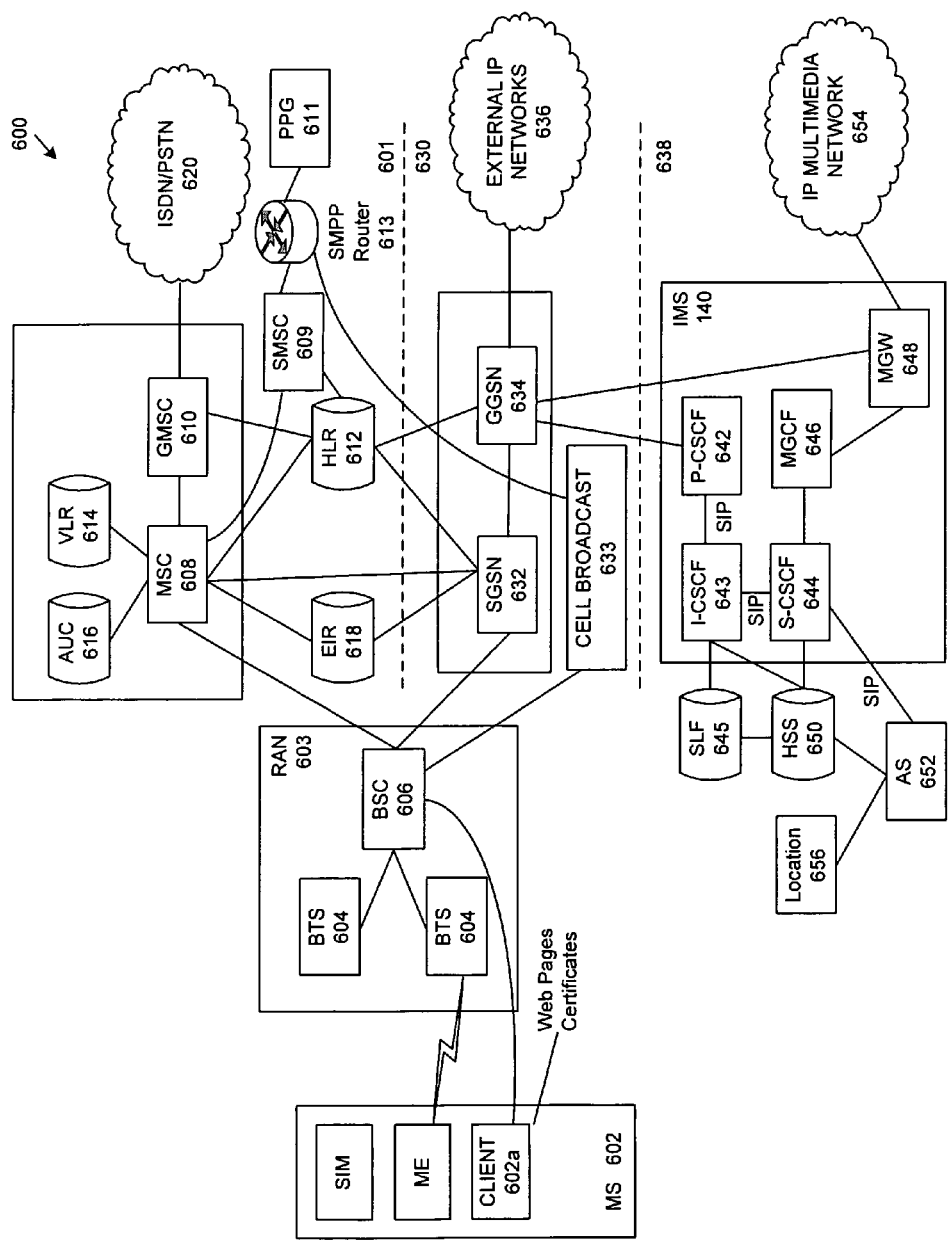
FIG. 6 illustrates an example alternate block diagram of an exemplary GSM/GPRS/IP multimedia network architecture in which the emergency notification system for a portable device using a personal area network compatible accessory may be employed.

FIG. 6 illustrates another exemplary block diagram view of a GSM/GPRS/IP multimedia network architecture 600 in which EAS alerting and reporting of the notification system for alerting users of portable devices of emergencies may be incorporated. As illustrated, architecture 600 of FIG. 6 includes a GSM core network 601, a GPRS network 630 and an IP multimedia network 638. The GSM core network 601 includes a Mobile Station (MS) 602, at least one Base Transceiver Station (BTS) 604 and a Base Station Controller (BSC) 606. The MS 602 is physical equipment or Mobile Equipment (ME), such as a mobile phone or a laptop computer (e.g., portable device 20) that is used by mobile subscribers, with a Subscriber identity Module (SIM). The SIM includes an International Mobile Subscriber Identity (IMSI), which is a unique identifier of a subscriber. The BTS 604 is physical equipment, such as a radio tower, that enables a radio interface to communicate with the MS. Each BTS may serve more than one MS. The BSC 606 manages radio resources, including the BTS. The BSC may be connected to several BTSs. The BSC and BTS components, in combination, are generally referred to as a base station (BSS) or radio access network (RAN) 603.

The GSM core network 601 also includes a Mobile Switching Center (MSC) 608, a Gateway Mobile Switching Center (GMSC) 610, a Home Location Register (HLR) 612, Visitor Location Register (VLR) 614, an Authentication Center (AuC) 618, and an Equipment Identity Register (EIR) 616. The MSC 608 performs a switching function for the network. The MSC also performs other functions, such as registration, authentication, location updating, handovers, and call routing. The GMSC 610 provides a gateway between the GSM network and other networks, such as an Integrated Services Digital Network (ISDN) or Public Switched Telephone Networks (PSTNs) 620. Thus, the GMSC 610 provides interworking functionality with external networks.

The HLR 612 is a database that contains administrative information regarding each subscriber registered in a corresponding GSM network. The HLR 612 also contains the current location of each MS. The VLR 614 is a database that contains selected administrative information from the HLR 612. The VLR contains information necessary for call control and provision of subscribed services for each MS currently located in a geographical area controlled by the VLR. The HLR 612 and the VLR 614, together with the MSC 608, provide the call routing and roaming capabilities of GSM. The AuC 616 provides the parameters needed for authentication and encryption functions. Such parameters allow verification of a subscriber's identity. The EIR 618 stores security-sensitive information about the mobile equipment.

A Short Message Service Center (SMSC) 609 allows one-to-one Short Message Service (SMS) messages to be sent to/from the MS 602. A Push Proxy Gateway (PPG) 611 is used to "push" (i.e., send without a synchronous request) content to the MS 602. The PPG 611 acts as a proxy between wired and wireless networks to facilitate pushing of data to the MS 602. A Short Message Peer to Peer (SMPP) protocol router 613 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 602 sends a location update including its current location information to the MSC/VLR, via the BTS 604 and the BSC 606. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 630 is logically implemented on the GSM core network architecture by introducing two packet-switching network nodes, a serving GPRS support node (SGSN) 632, a cell broadcast and a Gateway GPRS support node (GGSN) 634. The SGSN 632 is at the same hierarchical level as the MSC 608 in the GSM network. The SGSN controls the connection between the GPRS network and the MS 602. The SGSN also keeps track of individual MS's locations and security functions and access controls.

A Cell Broadcast Center (CBC) 633 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 634 provides a gateway between the GPRS network and a public packet network (PDN) or other IP networks 636. That is, the GGSN provides interworking functionality with external networks, and sets up a logical link to the MS through the SGSN. When packet-switched data leaves the GPRS network, it is transferred to an external TCP-IP network 636, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 630 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vice versa.

The IP multimedia network 638 was introduced with 3GPP Release 5, and includes an IP multimedia subsystem (IMS) 640 to provide rich multimedia services to end users. A representative set of the network entities within the IMS 640 are a call/session control function (CSCF), a media gateway control function (MGCF) 646, a media gateway (MGW) 648, and a master subscriber database, called a home subscriber server (HSS) 650. The HSS 650 may be common to the GSM network 601, the GPRS network 630 as well as the IP multimedia network 638.

The IP multimedia system 640 is built around the call/session control function, of which there are three types: an interrogating CSCF (I-CSCF) 643, a proxy CSCF (P-CSCF) 642, and a serving CSCF (S-CSCF) 644. The P-CSCF 642 is the MS's first point of contact with the IMS 640. The P-CSCF 642 forwards session initiation protocol (SIP) messages received from the MS to an SIP server in a home network (and vice versa) of the MS. The P-CSCF 642 may also modify an outgoing request according to a set of rules defined by the network operator (for example, address analysis and potential modification).

The I-CSCF 643, forms an entrance to a home network and hides the inner topology of the home network from other networks and provides flexibility for selecting an S-CSCF. The I-CSCF 643 may contact a subscriber location function (SLF) 645 to determine which HSS 650 to use for the particular subscriber, if multiple HSS's 650 are present. The S-CSCF 644 performs the session control services for the MS 602. This includes routing originating sessions to external networks and routing terminating sessions to visited networks. The S-CSCF 644 also decides whether an application server (AS) 652 is required to receive information on an incoming SIP session request to ensure appropriate service handling. This decision is based on information received from the HSS 650 (or other sources, such as an application server 652). The AS 652 also communicates to a location server 656 (e.g., a Gateway Mobile Location Center (GMLC)) that provides a position (e.g., latitude/longitude coordinates) of the MS 602.

The HSS 650 contains a subscriber profile and keeps track of which core network node is currently handling the subscriber. It also supports subscriber authentication and authorization functions (AAA). In networks with more than one HSS 650, a subscriber location function provides information on the HSS 650 that contains the profile of a given subscriber.

The MGCF 646 provides interworking functionality between SIP session control signaling from the IMS 640 and ISUP/BICC call control signaling from the external GSTN networks (not shown). It also controls the media gateway (MGW) 648 that provides user-plane interworking functionality (e.g., converting between AMR- and PCM-coded voice). The MGW 648 also communicates with other IP multimedia networks 654.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of a notification system for alerting users of wireless communication devices of emergencies using a personal area network compatible accessory have been described in connection with various computing devices, the underlying concepts can be applied to any computing device or system capable of providing a notification for alerting users of portable devices of emergencies. The various techniques described herein can be implemented in connection with hardware or software or, where appropriate, with a combination of both. Thus, the methods and apparatus for a notification system for alerting users of portable devices of emergencies, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing a notification for alerting users of portable devices of emergencies. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for a notification system for alerting users of wireless communication devices of emergencies using a personal area network compatible accessory also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a notification system for alerting users of wireless communication devices of emergencies using a personal area network compatible accessory. When implemented on a general-purpose processor, the program code combines with the processor to provide a unique apparatus that operates to invoke the functionality of a notification system for alerting users of wireless communication devices of emergencies using a personal area network compatible accessory. Additionally, any storage techniques used in connection with a notification system for alerting users of wireless communication devices of emergencies using a personal area network compatible accessory can invariably be a combination of hardware and software.

While a notification system for alerting users of wireless communication devices of emergencies using a personal area network compatible accessory has been described in connection with the various embodiments of the various figures, it is to be understood that other similar embodiments can be used or modifications and additions can be made to the described embodiment for performing the same function of the notification system for alerting users of wireless communication devices of emergencies using a personal area network compatible accessory without deviating therefrom. For example, one skilled in the art will recognize that the notification system for alerting users of wireless communication devices of emergencies using a personal area network compatible accessory as described in the present application may apply to any environment, whether wired or wireless, and may be applied to any number of such devices connected via a communications network and interacting across the network. Therefore, the notification system for alerting users of wireless communication devices of emergencies using a personal area network compatible accessory should not be limited to any single embodiment, but rather should be construed in breadth and scope in accordance with the appended claims.

What is claimed is:

1. A device comprising:
   memory comprising executable instructions stored thereon; and
   a processor coupled to the memory, the processor configured to execute the executable instructions to perform operations comprising:
      receiving a message from a cellular communication network;
      determining whether the message is a standard message or an emergency alert message;
      when it is determined that the message is a standard message, providing via a personal area network, a first notification, wherein:
         an intended recipient of the first notification is an accessory device within the personal area network; and
         the first notification comprises an indication of a first format for rendering an indication of the standard message;
      when it is determined that the message is an emergency alert message, providing via the personal area network, a second notification, wherein:
         an intended recipient of the second notification is the accessory device within the personal area network;
         the second notification comprises an indication of a second format for rendering an indication of the emergency alert message; and
         the first format differs from the second format.

2. The device of claim 1, the operations further comprising establishing the personal area network between the wireless communication device and the accessory device using a personal area network protocol.

3. The device of claim 1, wherein the message comprises at least one of a short message service (SMS) message, a broadcast text message, or a multimedia message service (MMS) message.

4. The device of claim 1, the operations further comprising determining whether the message is a standard message or an emergency alert message by determining whether a message identifier that identifies the message as an emergency alert message is present.

5. The device of claim 1, wherein the first format and the second format, each comprises at least one of an audio signal format, a vibration signal format, or an LED illumination signal format.

6. The device of claim 1, the operations further comprising determining whether the message is a standard message or an emergency alert message by identifying a type of alert communicated by the emergency alert message.

7. The device of claim 1, wherein determining whether the message is a standard message or an emergency alert message further comprises identifying an urgency of an alert communicated by the emergency alert message.

8. The device of claim 1, wherein determining whether the message is a standard message or an emergency alert message further comprises identifying a severity of an alert communicated by the emergency alert message.

9. A tangible computer readable storage medium that is not a transient signal per se, the computer readable storage having stored thereon executable instructions for performing operations comprising:
    causing a wireless communication device to receive a message from a cellular communication network;
    determining whether the message is a standard message or an emergency alert message;
    when it is determined that the message is a standard message, providing via a personal area network, a first notification, wherein:
        an intended recipient of the first notification is an accessory device within the personal area network; and
        the first notification comprises an indication of a first format for rendering an indication of the standard message;
    when it is determined that the message is an emergency alert message, providing via the personal area network, a second notification, wherein:
        an intended recipient of the second notification is the accessory device within the personal area network;
        the second notification comprises an indication of a second format for rendering an indication of the emergency alert message; and
        the first format being different from the second format.

10. The tangible computer readable storage medium of claim 9, having further computer executable instructions stored thereon for establishing the personal area network between the wireless communication device and the accessory device using a personal area network protocol.

11. The tangible computer readable storage medium of claim 9, wherein the computer executable instructions for determining whether the message is a standard message or an emergency alert message comprises computer executable instructions for determining whether a message identifier that identifies the message as an emergency alert message is present.

12. The tangible computer readable storage medium of claim 9, wherein the first format and the second format, each comprise at least one of an audio signal, a vibration signal, or an LED illumination signal format.

13. The tangible computer readable storage medium of claim 9, wherein the computer executable instructions for determining whether the message is a standard message or an emergency alert message comprises computer executable instructions for identifying a type of alert communicated by the emergency alert message.

14. The tangible computer readable storage medium of claim 9, wherein the computer executable instructions for determining whether the message is a standard message or an emergency alert message comprises identifying an urgency of an alert communicated by the emergency alert message.

15. The tangible computer readable storage medium of claim 9, wherein the computer executable instructions for determining whether the message is a standard message or an emergency alert message comprises identifying a severity of an alert communicated by the emergency alert message.

16. A device comprising:
    memory comprising executable instructions stored thereon; and
    a processor coupled to the memory, the processor configured to execute the executable instructions to perform operations comprising:
        receiving, via a personal area network, a notification indicative of one of a standard message or an emergency alert message;
        determining if the received notification is one of indicative of the standard message or indicative of the emergency alert message;
        when it is determined that the received notification is indicative of the standard message, determining a first format for rendering an indication of the received notification;
        when it is determined that the received notification is indicative of the emergency alert message, determining a second format for rendering an indication of the received notification, wherein the first format differs from the second format; and
        rendering an indication of the received notification via one of the first format or the second format.

17. The device of claim 16, wherein each of the first format and the second format comprise at least one of audio rendering, vibrational rendering, or a visual rendering.

18. The device of claim 16, wherein:
    the received notification is indicative of an emergency alert message;
    the received notification comprises an indication of a type of emergency; and
    the second format is indicative of the type of emergency.

19. The device of claim 16, wherein:
    the received notification is indicative of an emergency alert message;
    the received notification comprises an indication of a severity of the emergency; and
    the second format is indicative of the severity of the emergency.

20. The device of claim 16, wherein:
    the received notification is indicative of an emergency alert message;
    the received notification comprises an indication of an urgency of the emergency; and
    the second format is indicative of the urgency of the emergency.

\* \* \* \* \*